(12) United States Patent
Kalauch

(10) Patent No.: US 9,555,700 B2
(45) Date of Patent: Jan. 31, 2017

(54) TANK VENTILATION SYSTEM FOR A MOTOR VEHICLE

(71) Applicant: AUDI AG, Ingolstadt (DE)

(72) Inventor: Gerd Kalauch, Oberndorf (DE)

(73) Assignee: AUDI AG, Ingolstadt (DE)

( * ) Notice: Subject to any disclaimer, the term of this patent is extended or adjusted under 35 U.S.C. 154(b) by 55 days.

(21) Appl. No.: 14/429,629

(22) PCT Filed: Sep. 20, 2013

(86) PCT No.: PCT/DE2013/000535
§ 371 (c)(1),
(2) Date: Mar. 19, 2015

(87) PCT Pub. No.: WO2014/044245
PCT Pub. Date: Mar. 27, 2014

(65) Prior Publication Data
US 2015/0217636 A1 Aug. 6, 2015

(30) Foreign Application Priority Data
Sep. 20, 2012 (DE) .................. 10 2012 018 558

(51) Int. Cl.
*F02M 37/20* (2006.01)
*B60K 15/035* (2006.01)
*F02M 25/08* (2006.01)
*B60K 15/03* (2006.01)

(52) U.S. Cl.
CPC .... *B60K 15/03504* (2013.01); *F02M 25/0854* (2013.01); *B60K 2015/03256* (2013.01); *B60K 2015/03269* (2013.01); *B60K 2015/03282* (2013.01); *B60K 2015/03514* (2013.01); *Y10T 137/86332* (2015.04)

(58) Field of Classification Search
CPC .................. B60K 15/03504; F02M 25/0854; F02M 25/08; F02M 25/0818; F02M 25/0836; F02M 25/0872; F02M 25/089
USPC .......... 137/544–550, 588; 210/136; 123/516, 123/518, 519, 520, 698
See application file for complete search history.

(56) References Cited

U.S. PATENT DOCUMENTS

| 4,727,955 | A | 3/1988 | Honda |
| 4,940,101 | A | 7/1990 | Bauder |
| 5,337,721 | A * | 8/1994 | Kasuya ............. F02M 25/0854 123/519 |
| 5,687,697 | A | 11/1997 | Ishikawa |
| 5,855,198 | A | 1/1999 | Nakajima |
| 7,204,239 | B2 | 4/2007 | Iriyama |

(Continued)

FOREIGN PATENT DOCUMENTS

| DE | 3734414 | 10/1987 |
| DE | 196 50 517 | 6/1998 |

(Continued)

*Primary Examiner* — Craig Schneider
*Assistant Examiner* — Angelisa L Hicks
(74) *Attorney, Agent, or Firm* — Henry M. Feiereisen LLC

(57) ABSTRACT

A tank ventilation system for a motor vehicle has a fuel tank, a fuel vapor store which is connected to a fuel tank, and a ventilating device which is connected to the fuel vapor store, in order to ventilate the latter. The ventilating device has an aeration line which opens in an interior space of the motor vehicle, which interior space is delimited on all sides by vehicle body parts from the surroundings of the motor vehicle.

10 Claims, 4 Drawing Sheets

(56) References Cited

U.S. PATENT DOCUMENTS

| | | | |
|---|---|---|---|
| 7,909,919 B2 | 3/2011 | Kosugi | |
| 2001/0042399 A1* | 11/2001 | Dawson | F02M 25/0809 73/49.7 |
| 2002/0092562 A1 | 7/2002 | Kami et al. | |
| 2006/0032546 A1 | 2/2006 | Bolle | |
| 2009/0159055 A1* | 6/2009 | Ohhira | B60K 15/03504 123/519 |
| 2012/0240664 A1* | 9/2012 | Yasuzaka | G01M 3/025 73/40.7 |
| 2013/0255645 A1 | 10/2013 | Grass | |

FOREIGN PATENT DOCUMENTS

| | | |
|---|---|---|
| DE | 102 00 281 | 9/2002 |
| DE | 10 2007 056 675 A1 | 5/2009 |
| EP | 1 625 963 | 2/2006 |
| JP | S60 151 128 A | 8/1985 |
| JP | H08 135 525 A | 5/1996 |
| JP | 2010070028 | 4/2010 |
| WO | WO2012/080177 | 6/2012 |

* cited by examiner

TANK VENTILATION SYSTEM FOR A MOTOR VEHICLE

CROSS-REFERENCES TO RELATED APPLICATIONS

This application is the U.S. National Stage of International Application No. PCT/DE2013/000535, filed Sep. 20, 2013, which designated the United States and has been published as International Publication No, WO 2014/044245 and which claims the priority of German Patent Application, Serial No. 10 2012 018 558.8, filed Sep. 20, 2012, pursuant to 35 U.S.C. 119(a)-(d).

BACKGROUND OF THE INVENTION

The invention relates to a tank ventilation system for a motor vehicle according to the preamble of patent claim 1.

Such a tank ventilation system is known from DE 196 50 517 C2. The hydrocarbons escaping from the tank are absorbed in an activated carbon filter. For regeneration of the activated carbon filter the absorbed hydrocarbons are aspirated into the intake duct at defined operating states of the internal combustion engine and supplied to the cylinder for combustion. In order to achieve a rinsing effect of the activated carbon filter an aeration line is provided which connects the activated carbon filter with the atmosphere when the aeration valve is open. The ventilation line usually exits at an outside of the motor vehicle.

In such known tank ventilation devices however the functioning may be impaired.

SUMMARY OF THE INVENTION

It is an object of the present invention to provide a tank ventilation device, which is characterized by a higher operational reliability.

This object is solved by the tank ventilation system for a motor vehicle including a fuel tank a fuel vapor accumulator which is connected with the fuel tank; and a ventilation device connected with the fuel vapor accumulator to ventilate the fuel vapor accumulator, said ventilation device having an aeration line which opens into an internal space of the motor vehicle, said internal space being delimited on all sides by vehicle body parts. Advantageous embodiments of the invention are described in the dependent claims.

A tank ventilation system for a motor vehicle according to claim 1 has a fuel tank, a fuel vapor accumulator connected with the fuel tank and a ventilation device connected with the fuel vapor accumulator in order to ventilate the same. The tank ventilation system is characterized in that the ventilation device has an aeration line which opens into an interior of the motor vehicle.

The term ventilation device is meant to relate to a device by means of which the fuel vapor accumulator is pneumatically connectable with the environment or the atmosphere. In particular this may involve lines and valves arranged in the lines. The ventilation device can be configured so that only an aeration of the fuel vapor accumulator, i.e., a supply of ambient air into the fuel vapor accumulator, is possible. The ventilation device can however also be configured so that an aeration as well as a venting, i.e., a discharge of gas from the fuel vapor accumulator to the environment is possible. Accordingly the term "ventilation" includes the venting as wells as the aeration of the fuel vapor accumulator.

The core idea of the invention is to configure and provide the aeration line so that it opens into an interior of the motor vehicle, which is delimited from all sides against the environment of the vehicle (100) by vehicle body parts. On one side the aeration line is pneumatically connected with the fuel vapor accumulator. On the other side the aeration line has a free end with an intake opening via which ambient air can flow through the aeration line into the internal space of the fuel vapor accumulator. On this free end the aeration line opens into an internal space of the motor vehicle.

The term internal space of the motor vehicle means a space inside the system boundaries of the motor vehicle. Advantageous examples are the passenger compartment, the luggage compartment or a functional space (spare tire space, battery space). The system boundary of the motor vehicle separates the motor vehicle from the environment. Advantageously the internal space is delimited toward all sides against the environment. Most advantageously the internal space is additionally sealed against the environment so that no water can enter and the internal space remains dry. The significant advantage of the tank ventilation device according to the invention is that no or only very small amounts of liquid or moisture is carried via the aeration line into the fuel vapor accumulator and the entire tank ventilation system. In particular the free end and the intake opening of the aeration line is well protected against splash water, spray and rain. In contrast to the solutions known from the state of the art where the ventilation does not open into the interior of the motor vehicle but to the environment (for example in the wheel housing or on the floor panel) the risk of water hammer and corrosion can be significantly reduced which significantly improves the functional reliability of the tank ventilation system.

In an embodiment of the tank ventilation system the ventilation device has at least one aeration valve which enables a gas flow from the opening of the aeration line in the direction of the fuel vapor accumulator, but prevents a backflow.

The aeration valve very reliably prevents hydrocarbons stored in the fuel vapor accumulator from escaping into the interior of the motor vehicle. In particular for an application in which the aeration line opens into a luggage compartment or into a passenger compartment of the motor vehicle possible unpleasant odors can be prevented to the most degree. This contributes to the comfort of the passengers. For further improving the tightness the aeration valve can be configured as a multivalve.

In an embodiment of the tank ventilation system the ventilation device has a venting line which opens into the environment of the motor vehicle. The venting line has at least one venting valve, which permits a gas flow from the fuel vapor accumulator in the direction to the environment, but prevents a backflow.

The venting line serves for the controlled discharge of hydrocarbons form the fuel vapor accumulator into the environment of the motor vehicle for the rare case of a breach or excessive stress on the fuel vapor accumulator. Such situations particularly occur in the case of an increased outgassing of the fuel in the fuel tank at high temperatures and at standstill of the internal combustion engine. In order to avoid damage to the tank ventilation system in this case a pressure relieve of the fuel vapor accumulator has to be ensured. In contrast to the aeration line the venting line opens into the environment of the motor vehicle. The venting line ensures that no external air is aspirated from the environment into the fuel vapor accumulator. This is to occur exclusively through the aeration line. This ensures that also no moisture enters the fuel vapor accumulator from the environment via the venting line.

In another embodiment of the tank ventilation system a further fuel vapor accumulator is arranged in the aeration line.

This fuel vapor accumulator can for example be configured as activated carbon filter. Because an absolute tightness of the aeration valve cannot always be guaranteed the further fuel vapor accumulator serves for adsorption of small amounts of hydrocarbons in the aeration line which would flow from the fuel vapor accumulator via the aeration line and the aeration valve into the interior of the motor vehicle. This enables preventing exposure to unpleasant smells in the interior of the motor vehicle.

In another embodiment of the tank ventilation system the aeration valve and the further fuel vapor accumulator are integrated in one structural component.

Hereby according to another embodiment of the tank ventilation system, the structural component can have a particle filter in order to filter particles contained in the aeration line, wherein the particle filter has a coating which stores hydrocarbons.

These embodiments ensure a compact construction and reduce the number of individual components of the tank ventilation system. Providing a particle filter prevents entering of dust and dirt particles into the tank ventilation system which increases the operational reliability of the tank ventilation system.

In another embodiment of the tank ventilation system a sound damper and/or an additional ventilation valve is arranged in the aeration valve is arrange din the aeration line.

The sound absorber enables preventing the propagation of sound from the tank ventilation system into the interior space and with this noise pollution. The additional aeration valve serves merely as protection against backflow of hydrocarbons from the fuel vapor accumulator via the aeration line into the interior space.

According to another embodiment of the tank ventilation system the at least one aeration valve and the at least one venting valve are formed by one structural unit.

For example both valves can be integrated in a three-way valve. Such a valve has a total of three connections. One for the venting line, one for the aeration line, and one for the connection line to the fuel vapor accumulator. This embodiment ensures a very compact and service friendly construction.

BRIEF DESCRIPTION OF THE DRAWING

In another embodiment of the tank ventilation the ventilation device has a leakage detection device for detecting a leakage in the tank ventilation system. The leakage detection device is arranged between the aeration valve and the fuel vapor accumulator.

The arrangement of the leakage detection device between the aeration valve and the fuel vapor accumulator ensures that the leakage detection device is protected against moisture, water hammer, dust and dirt particles. Because leakage detection devices often have a pump for evacuating or pressurizing the tank ventilation system, in particular the fuel vapor accumulator, and also sensitive valves and sensors this ensures the proper functioning of these components.

According to another aspect of the invention a motor vehicle has a tank ventilation system according to one of the above described embodiments.

Regarding the resulting advantages of this motor vehicle, reference is made to the description regarding the preceding claims, which apply analogously.

In the following the invention is explained in more detail with reference to the included Figures. In the Figures:

DETAILED DESCRIPTION OF PREFERRED EMBODIMENTS

Figure 1:
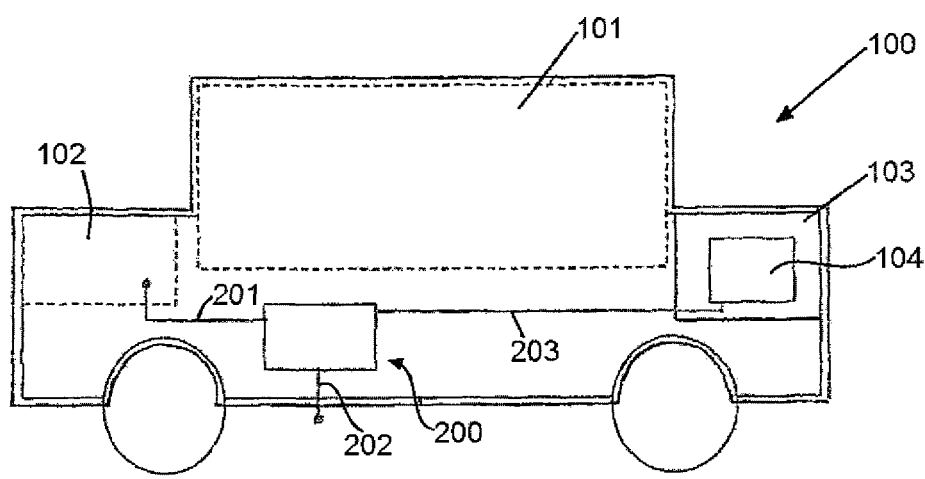
Figure 2:
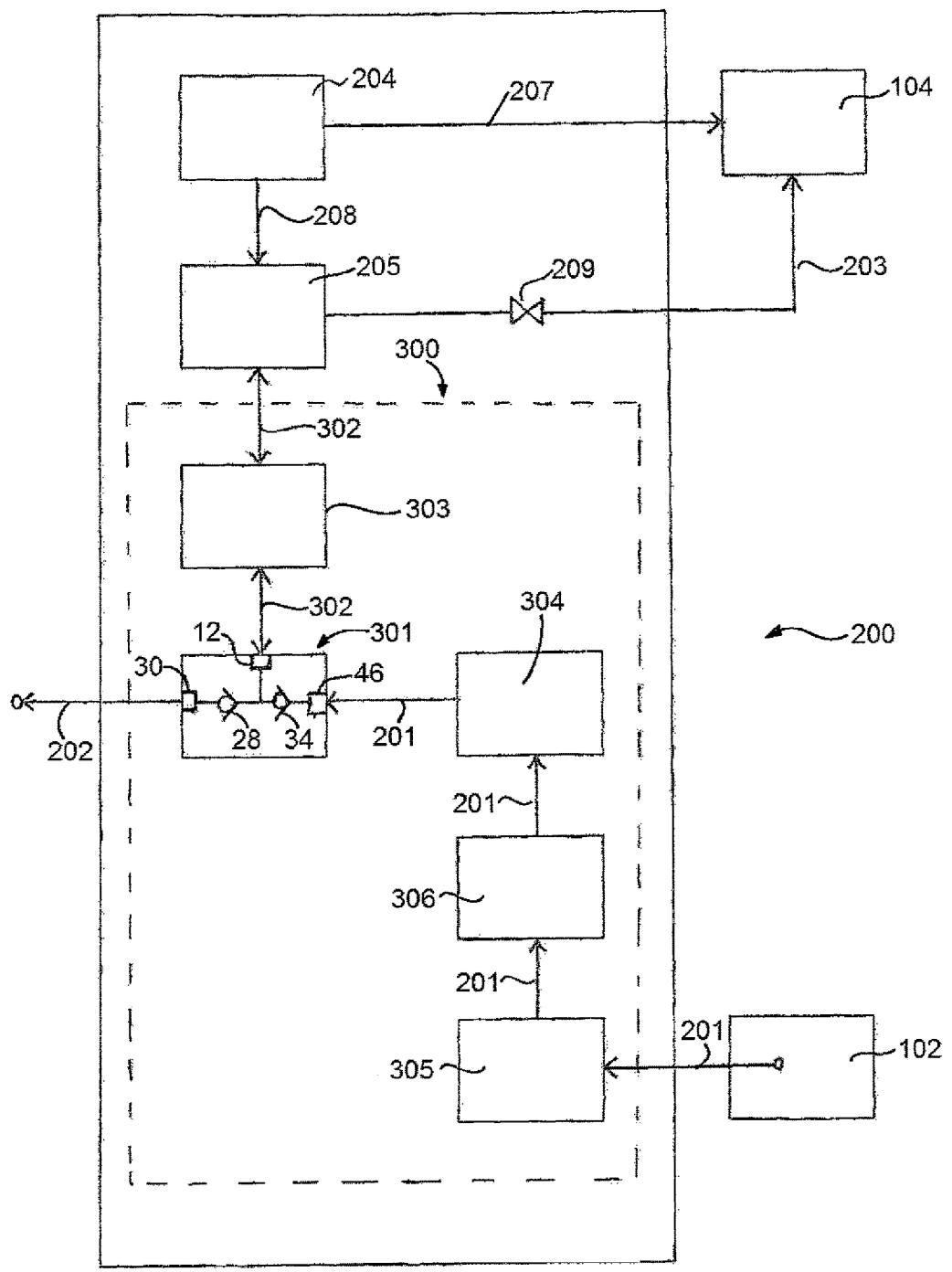
Figure 3A:
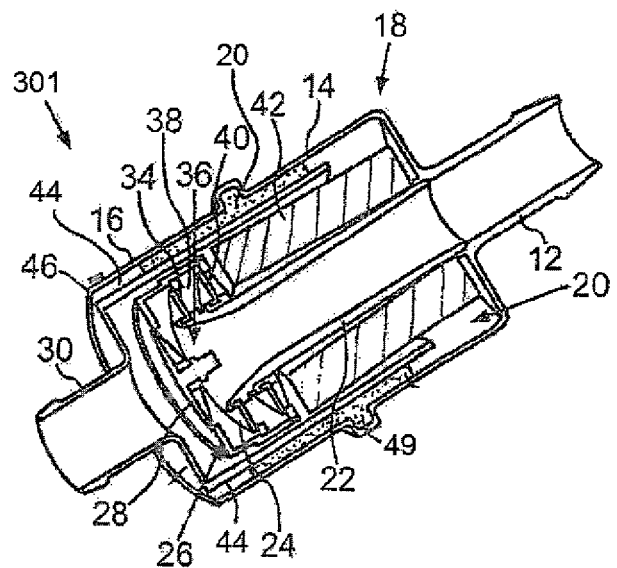
Figure 3B:
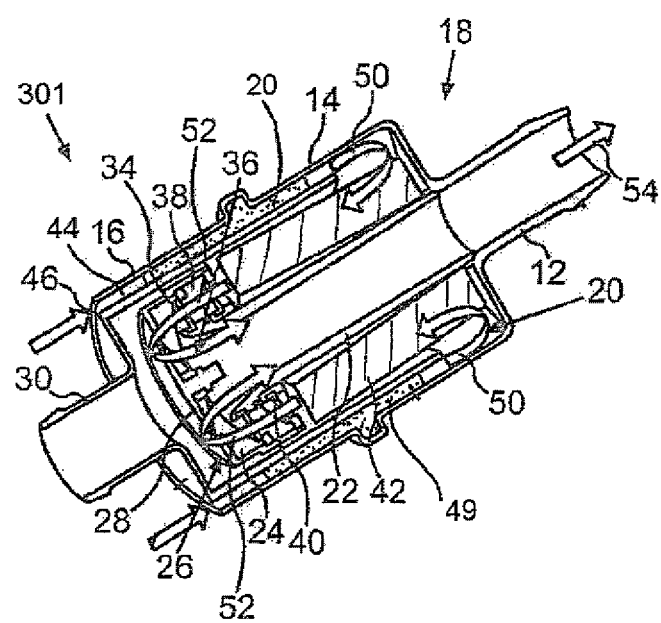
Figure 3C:
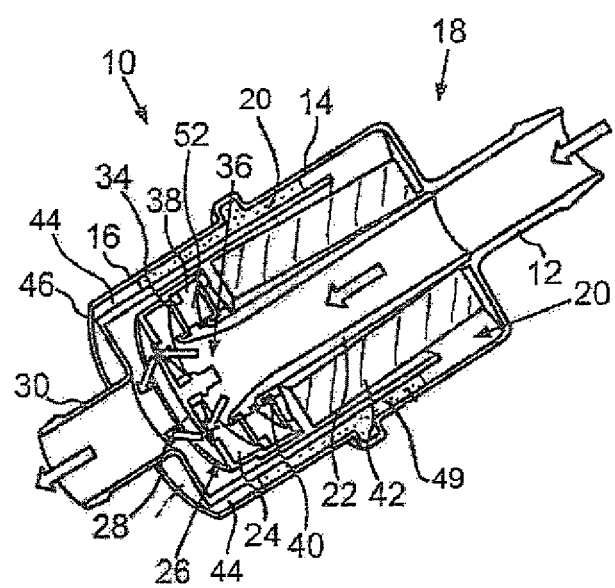

FIG. 1 is a schematic representation of a motor vehicle with a tank ventilation system;

FIG. 2 a schematic representation of an exemplary embodiment of the tank ventilation system;

FIGS. 3A to 3C schematic cross sectional views of a structural component with integrated ventilation valve and venting valve.

FIG. 1 schematically shows a motor vehicle 100. As an example two interior spaces indicated with dashed lines are shown: The passenger compartment 101 and the luggage compartment 102. The interior space within the meaning of the invention includes spaces within the system boundaries of the motor vehicle 100, which are advantageously delimited from the environment by vehicle body parts so that during normal operation of the motor vehicle 100 entering of water (water drops, rain, splash water, spray etc.) is substantially prevented. Thus also a motor compartment 103 of the motor vehicle 100 can be regarded as internal space within the meaning of the invention if it is delimited against the environment and protected against entering of water by a correspondingly constructed floor panel. Beside these principle interior spaces the motor vehicle has however multiple further internal spaces within the meaning of the invention, which however are not shown here for reasons of simplicity.

The motor vehicle 100 further has an internal combustion engine 104 and a tank ventilation system 200. The tank ventilation system 200 is connected via an aeration line 201 with one of the internal spaces (here the luggage compartment), via a venting line 202 with the environment and via a regeneration line 203 with the internal combustion engine 104.

FIG. 2 schematically shows an exemplary embodiment of the tank ventilation system 200. The tank ventilator system 200 has a fuel tank 204, a fuel vapor accumulator 205 and a ventilation device 300. The fuel tank 204 serves as storage container in particular for liquid fuels and is connected with the internal combustion engine 104 via a fuel supply line 207. Because liquid fuel tends to outgassing with rising temperature and sinking ambient pressure (high altitude drives) fuel vapors in the form of hydrocarbons are present in the fuel tank 204 above the liquid level. For legal reasons these fuel vapors must not be conducted into the environment. For this reason the fuel vapor accumulator 205 is connected with the fuel tank 204 via a connection line 208 so that the fuel vapors generated in the fuel tank can flow into the fuel vapor accumulator 205 via the connection line 208. The fuel vapor accumulator 205 is in particular configured as activated carbon container so that the fuel vapors are adsorbed on the activated carbon particles and thus stored. In order to avoid an overloading of the fuel vapor accumulator 205 the latter has to be regenerated from time to time. For this the fuel vapor accumulator 205 is connected with the internal combustion engine 104, in particular the intake system of the internal combustion engine (not shown), via the regeneration line 203 and a controllable regeneration system 209, in order to supply the fuel vapors to the combustion chambers of the internal combustion engine 104 in defined operating ranges in a controlled manner for combustion.

For the regeneration and for relieving in emergency situations the fuel vapor accumulator 205 is connected with the luftungseinrichtung 300. In the exemplary embodiment the ventilation device 300 has a valve device 301 in which at least one aeration valve 34 and at least one venting valve 28 in the form of a three-way valve are combined in a compact structural unit (see FIGS. 3A to 3C).

The valve device 301 is connected on a venting connection with the fuel vapor accumulator 205 via a venting line 302. The valve device 301 is also connected with at least one of the internal spaces (here the luggage compartment) of the vehicle on an aeration connection 46, wherein the aeration line opens with its intake opening into the respective internal space 192 of the motor vehicle 100.

The valve device is also connected with the environment at an venting connection 30 via a venting line line 202, wherein the venting line 202 opens into the environment of the motor vehicle—outside of the its system boundaries.

The aeration valve 34 is configured so as to enable gas flow from the opening of the aeration line 201 into the internal space 102 of the motor vehicle in the direction of the fuel vapor accumulator 205 but so as to prevent a backflow. As a result substantially dry air can flow from the interior space of the motor vehicle via the aeration line 201 into the fuel vapor accumulator 205 and thus supply and rinse the fuel vapor accumulator 205 with fresh air during its regeneration (open regeneration valve 209).

The venting valve 28 is configured so as to prevent gas flow from the fuel vapor accumulator 205 in the direction of the environment but to prevent a backflow.

In the exemplary embodiment the ventilation device 300 also has a leakage detection device 303 for detecting a leakage in the tank ventilation system 200 of the motor vehicle. The leakage detection device 303 is arranged in the ventilation line 302 between the fuel vapor accumulator 205 and the valve device 301. Such leakage detection devices 303 are well known in the state of the art. In particular these leakage detection devices 303 can have a pump and a pressure sensor (not shown) by means of which a defined pressure can be established in the tank ventilation system 200 and conclusions regarding a leakage be drawn based on the pressure course detected by the pressure sensor. The leakage detection hereby functions according to the principle of an overpressure or underpressure.

In the aeration line 201 advantageously a further fuel vapor accumulator 304 can be arranged. The latter can for example be arranged as a separate component in the form of a compact activated carbon capsule in the aeration line 201. Advantageously the further fuel vapor accumulator can be integrated in the valve device 301. Details regarding this are explained in more detail by way of FIGS. 3A to 3G. This further fuel vapor accumulator 304 serves for adsorbing small traces of fuel vapors, which escape via the aeration line 34 and would thus flow unimpeded into the internal space of the motor vehicle. In this way unpleasant odors in the interior space 102 of the motor vehicle can be avoided. The further fuel vapor accumulator 304 is automatically regenerated at each aeration of the fuel vapor accumulator 205.

Advantageously a sound absorber 305 can be provided in the aeration line 201 in order to block sounds from entering the internal space 102 of the motor vehicle form the tank ventilation system 200. This allows significantly improving the comfort of the passengers of the motor vehicle.

Further advantageously a further aeration valve 306 can be arranged in the aeration line 201. This aeration valve is also configured so as to permit a flow of gas from the interior space 102 in the direction of the fuel vapor accumulator 205 but prevents a backflow. Such a further aeration valve 306 improves the tightness of the interior space 102 against the tank ventilation system 200.

It is noted that the further aeration valve 306, the sound absorber 306, the additional fuel vapor accumulator 304, the leakage detection device 303 and the venting valve 28 together with the venting line 202 are not essential components within the meaning of the invention but are merely advantageous additional components which provide the mentioned advantages. Rather it is regarded as essential that the ventilation device 300 has the aeration line 201 and that the aeration line opens into the interior space of the motor vehicle to conduct substantially dry air from the interior space 102 of the motor vehicle into the fuel vapor accumulator 205 for aerating the fuel vapor accumulator 205. It is further not required within the meaning of the invention that the at least one aeration valve 34 and the venting valve 28 are configured ds one structural unit (in the form of a three-way valve). Rather it is also possible to couple the fuel vapor accumulator 205 with the interior space 102 of the motor vehicle via an aeration line 201 and the aeration valve 34 arranged therein, and to couple the fuel vapor accumulator 205 with the environment via a separate venting line 202 and the separate venting valve 28 arranged therein.

The presented tank ventilation system 200 offers the advantage that for aeration of the fuel vapor accumulator 205 substantially dry air flows from the internal space 102 via the aeration line 201 into the fuel vapor accumulator 205. In this way the fuel vapor accumulator 205, the ventilation device 300 together with the optionally provided leakage detection device 303 are protected very well against damage by water hammer or moisture. This allows significantly increasing the functional reliability of the tank ventilation system 200.

With reference to FIGS. 3A, 3B and 3C an advantageous embodiment of the valve device 301 of the ventilation system 300 is now described in more detail. FIG. 3A shows a schematic cross sectional view of the valve device 301 configured as three-way valve. For explaining the functional principle, FIG. 3B or 3C additionally show the flow conditions during aeration or venting of the fuel vapor accumulator 205 by arrows. The ventilation line, the aeration line and the venting line are not shown for reasons of simplicity.

The valve device 301 has a ventilation connection 12 via which it is connected by means of the ventilation line (for a example a tube) with the fuel vapor accumulator 205. The ventilation concoction 12 is configured one-piece with a housing part 14, which together with a further housing part 16 forms the housing 18 of the device 10. The housing 8 is configured cylindrical and arranged coaxially on the ventilation connection 12.

In the interior space 20 of the housing 18 the ventilation connection 12 is adjoined by a tube 22. The tube 22 opens into a valve chamber 24 of a three way valve 26. The three way valve 26 has the venting valve 28 which delimits the valve chamber 24 from the venting connection 30 via which the valve device 301 is connected with the environment by means of the venting line 202 (see FIG. 2). The venting valve 28 is configured so that it is closed when the ambient pressure is higher than the pressure on the side of the ventilation connection 12. Vice versa the venting valve 28 is open when the pressure in the ventilation connection 12 exceeds the pressure on the venting connection 30 (ambient pressure) by a defined value.

When the pressure in the fuel vapor accumulator 205 (see FIG. 2) exceeds the ambient pressure by the defined value, the hydrocarbons stored therein flow into the valve device 201 (see FIG. 3) via the ventilation line 302 and the ventilation connection 12. The venting valve 28 opens so that the hydrocarbons can flow into the environment via the venting connection 30 and the venting line 202 (see FIG. 3C). The tube 22 and the venting connection 30 in this represent a part of the venting line. The ventilation line 302 in this case functions as venting line.

The valve device in the exemplary embodiment also has two aeration valves 34, 40. However one single aeration valve is also sufficient. The aeration valves 34, 40 are configured as ring shaped valve flaps. The one aeration valve 34 concentrically surrounds the end region 36 of the tube 22 and closes the valve space 24 against an intermediate chamber. The intermediate chamber 38 is delimited by the other aeration valve 40, which separates the intermediate chamber 38 from a particle filter 42. The aeration valves 34, 40 close in the same direction. The housing part 16 serves as aeration connection 46 for the aeration line 201 (see FIG. 2). For example the aeration line, which is configured as tube, can be pushed onto the aeration connection 46 or the housing part 16. Further an annular channel 44 is formed between the housing 18 and the venting connection 30 which functions as a part of the aeration line 201.

In the annular channel 44 the further fuel vapor accumulator 304 can be arranged in the form of an activated carbon filter. As an alternative and in addition the further fuel vapor accumulator 304 can be integrated in the particle filter 42.

In case of an underpressure (relative to the ambient pressure) in the fuel vapor accumulator (for example during regeneration of the fuel vapor accumulator 205) the aeration valves 34, 40 open while the venting valve 28 closes. Via the aeration connection 46 and the annular channel 44 ambient air then flows through the further fuel vapor accumulator 49 and the particle filter 42 in the direction of the arrow 50 as shown in FIG. 3B. Further the air flows through the intermediate chamber 38 and the valve chamber 42 along the arrows 52 into the tube 22. Via the ventilation connection 12 and the ventilation line 302 the aspirated air can flow in the direction of the arrow 54 to the fuel vapor accumulator 205, compensate an underpressure and achieve a rinsing effect. The ventilation line functions in this case as aeration line.

The further fuel vapor accumulator 304 is provided for the case that—despite closed aeration valves—traces of hydrocarbons enter the aeration line. These are adsorbed by the activated carbon so that unpleasant smells are avoided. In the following aeration of the fuel vapor accumulator the further fuel vapor accumulator 304 is rinsed or regenerated again.

The invention claimed is:

1. A tank ventilation system for a motor vehicle, comprising:
  a fuel tank;
  a fuel vapor accumulator which is connected with the fuel tank;
  a ventilation device connected with the fuel vapor accumulator to ventilate the fuel vapor accumulator, said ventilation device including an aeration line which opens into an internal space which is delimited on all sides by vehicle body parts, and at least one aeration valve to enable a gas flow from the aeration line to the fuel vapor accumulator but prevents a backflow; and
  a further fuel vapor accumulator arranged in the aeration line, said at least one aeration valve and the further fuel vapor accumulator being integrated in a structural unit, said structural unit including a particle filter to filter particles present in the aeration line, said particle filter having a coating which stores hydrocarbons.

2. The tank ventilation system of claim 1, wherein the ventilation device has a venting line which opens into an environment of the motor vehicle, and wherein the ventilation device has at least one venting valve which enables a gas flow form the fuel vapor accumulator in the direction of the environment but prevents a backflow.

3. The tank ventilation system of claim 2, wherein the at least one aeration valve and the at least one venting valve are configured as a structural unit.

4. The tank ventilation system of claim 1, further comprising at least one member selected from the group consisting of a sound absorber and an additional aeration valve, said member being arranged in the aeration line.

5. The tank ventilation system of claim 1, wherein the ventilation device includes a leakage detection device for detecting a leakage in the tank ventilation system of the motor vehicle, said leakage detection device being arranged between the at least one aeration valve and the fuel vapor accumulator.

6. A motor vehicle, comprising the tank ventilation system, said tank ventilation system including a fuel tank, a fuel vapor accumulator which is connected with the fuel tank, a ventilation device connected with the fuel vapor accumulator to ventilate the fuel vapor accumulator, said ventilation device including an aeration line which opens into an internal space which is delimited on all sides by vehicle body parts, and at least one aeration valve to enable a gas flow from the aeration line to the fuel vapor accumulator but prevents a backflow, and a further fuel vapor accumulator arranged in the aeration line, said at least one aeration valve and the further fuel vapor accumulator being integrated in a structural unit, said structural unit including a particle filter to filter particles present in the aeration line, said particle filter having a coating which stores hydrocarbons.

7. The motor vehicle of claim 6, wherein the ventilation device has a venting line which opens into an environment of the motor vehicle, and wherein the ventilation device has at least one venting valve which enables a gas flow form the fuel vapor accumulator in a direction of the environment but prevents a backflow.

8. The motor vehicle of claim 6, wherein the tank ventilation system includes at least one member selected from the group consisting of a sound absorber and an additional aeration valve, said member being arranged in the aeration line.

9. The motor vehicle of claim 6, wherein the at least one aeration valve and the at least one venting valve are configured as a structural unit.

10. The motor vehicle of claim 6, wherein the ventilation device includes a leakage detection device for detecting a leakage in the tank ventilation system of the motor vehicle, said leakage detection device being arranged between the at least one aeration valve and the fuel vapor accumulator.

* * * * *